United States Patent [19]

Rollat et al.

[11] Patent Number: 4,834,952
[45] Date of Patent: May 30, 1989

[54] PURIFICATION OF BARIUM VALUES

[75] Inventors: Alain Rollat, La Rochelle; Jean-Louis Sabot, Maisons-Laffitte, both of France

[73] Assignee: Rhone-Poulenc Chimie, Courbevoie, France

[21] Appl. No.: 20,363

[22] Filed: Mar. 2, 1987

[30] Foreign Application Priority Data

Feb. 28, 1986 [FR] France ............... 86 02791

[51] Int. Cl.$^4$ .............. B01D 11/04; C01F 11/00
[52] U.S. Cl. ............... 423/157; 423/395; 423/430; 423/497; 423/635; 423/165; 75/101 BE; 75/108; 75/121; 210/673; 210/685; 210/688
[58] Field of Search .......... 423/157, 635, DIG. 14, 423/395, 497, 430, 165; 75/101 BE, 121, 108; 210/688, 685, 673

[56] References Cited

U.S. PATENT DOCUMENTS

| | | | |
|---|---|---|---|
| 3,122,414 | 2/1964 | Horner et al. | 423/157 |
| 3,574,531 | 4/1971 | Schultz | 423/10 |
| 3,637,711 | 1/1972 | Budde et al. | 546/179 |
| 3,694,369 | 9/1972 | Orlandini | 423/157 |

FOREIGN PATENT DOCUMENTS

| | | | |
|---|---|---|---|
| 2277897 | 2/1976 | France | |
| 45-30454 | 10/1970 | Japan | 423/157 |
| 1013711 | 12/1965 | United Kingdom | 423/635 |

OTHER PUBLICATIONS

Chemical Abstracts, vol. 76, 1972, p. 329, No. 1451b, "Extraction of alkaline-earth elements and magnesium by aliphatic . . .".
Chemical Abstracts, vol. 82, 1975, p. 338, No. 16790e, "Extraction of strontium by monocarboxylic acids . . .".
Chemical Abstracts, vol. 86, 1977, p. 449, No. 128205p, "Extraction of alkaline earth elements using carboxylic . . .".
Chemical Abstracts, vol. 83, 1975, p. 204, No. 31323a, "Extraction of alkaline earth elements and magnesium . . .".
Chemical Abstracts, vol. 86, 1977, p. 387, No. 22447d, "Extraction of alkaline earth metals by hexyl ester . . .".
Chemical Abstracts, Vol. 83, 1975, p. 489, No. 121568p, "Extractionsome processes of separation of alkaline . . .".
Chemical Abstracts, vol. 101, p. 571, No. 239447s, "The Extraction behavior of ligands of the CMAB-quinolin-8-ol . . .".
Prokhorova et al, "Extraction of the Alkaline Earth Elements by Carboxylic Acids," *Translated from Radiokhimiya*, vol. 19, No. 1, pp. 46-51, Jan.-Feb., 1977.

*Primary Examiner*—Robert L. Stoll
*Attorney, Agent, or Firm*—Burns, Doane, Swecker & Mathis

[57] ABSTRACT

Purified barium salts essentially devoid of strontium impurities, e.g., highly pure barium carbonate, are produced by liquid/liquid extracting an aqueous solution of impure barium values with an organic solvent medium which comprises at least one water-insoluble carboxylic acid, phosphonic acid monoester, or substituted 8-hydroxyquinoline extractant. The mixture of extraction is separated into a purified aqueous phase containing the desired barium salt values and an organic phase containing the impurity values sought to be removed.

30 Claims, No Drawings

PURIFICATION OF BARIUM VALUES

BACKGROUND OF THE INVENTION

1. Field of the Invention

The present invention relates to the preparation of purified barium-based compounds, and, more especially, to the preparation of a purified barium salt, in particular having a low strontium content. The process of the invention is particularly advantageous for the production of barium carbonate in a high degree of purity, which carbonate is a convenient precursor for a barium titanate having the same degree of purity.

2. Description of the Prior Art

The demand for high-purity barium salts is increasing, for example, for use in barium titanate-based ceramic capacitors or barium hexaferrite-based magnetic discs.

However, barium-based ores, whether comprising, e.g., sulfate, as in barytes, or carbonate, as in the case of withesite, contain many impurities, in particular iron, calcium, sodium and strontium. Other impurities such as chlorine or sulfur may also be introduced over the course of the conventional processes for the production of barium carbonate.

And while most of the aforenoted impurities typically accompanying barium may be removed relatively easily by conventional precipitation/redissolution processes, the removal of trace amounts of strontium remains an acute problem due to the high degree of similarity between the chemical properties of these two elements.

Even given the fact that processes for the separation of strontium and barium are known to this art, for example, based on chromatography or on ion exchange procedures, these are only laboratory-scale procedures which permit quantitative determination of the strontium, rather than true separation processes which can be carried out technically or economically on an industrial scale.

SUMMARY OF THE INVENTION

Accordingly, a major object of the present invention is the provision of an industrial process for the separation of barium and strontium values, to produce high-purity barium salts characterized by, in particular, an Sr/Ba ratio of at most 200 ppm.

Briefly, the present invention features the effective removal of strontium from an aqueous solution of barium values by contacting such solution with an organic solvent comprising at least one essentially water-insoluble extractant of the cationic or cationic/chelating type. The subject extractants include:

(i) either a carboxylic acid having the following general formula (I):

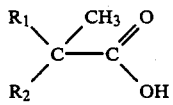

in which $R_1$ and $R_2$ are straight or branched chain alkyl radicals, or substituted such alkyl radicals, with the proviso that the total number of carbon atoms present in said two radicals is at least equal to 6;

(ii) or a phosphonic acid monoester having the following general formula (II):

in which $R'_1$ and $R'_2$ are straight or branched chain, but nonhalogenated alkyl or alkenyl radicals;

(iii) or an 8-hydroxyquinoline having the following general formula (III):

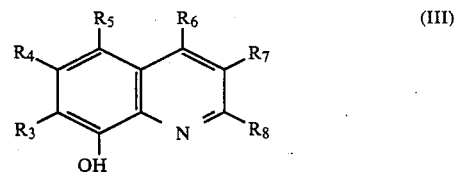

in which $R_3$, $R_4$, $R_5$, $R_6$, $R_7$ and $R_8$, which may be identical or different, are each hydrogen, or a substituted or unsubstituted alkyl, alkenyl, alicyclic or aromatic radical, with the proviso that $R_3$, $R_4$, $R_5$, $R_6$, $R_7$ and $R_8$ may not all be hydrogen at the same time. After the contacting/extraction, following separation of the phases, a purified final aqueous solution of barium is recovered, as is an organic phase which is charged with impurities, in particular the contaminating strontium values.

DETAILED DESCRIPTION OF THE PREFERRED EMBODIMENTS OF THE INVENTION

More particularly according to the present invention, the aforenoted extractants (i), (ii), and (iii) preferentially extract strontium, which means that the amounts of solvent to be used remain limited. Moreover, and more particularly in the case of the substituted 8-hydroxyquinoline, the strontium/barium separation factors obtained are sufficiently high for the number of stages necessary for a given purification to be low.

Upstream of the process of the invention, the raw material selected for treatment advantageously comprises the barytes, i.e., barium sulfate-based ores, which are reduced to the sulfide, BaS, by reaction with coke. The barium sulfide is then treated in a manner known, per se, to produce a barium carbonate of standard quality, namely, having a strontium content which typically ranges from 1 to 5% by weight with respect to the amount of barium (Sr/Ba).

It too will be appreciated that any other starting material containing barium may also be used without departing from the ambit of the present invention.

The barium carbonate produced in such manner is then treated with an acid, in particular hydrochloric acid or nitric acid, thereby respectively producing an aqueous solution of barium chloride or a solution of barium nitrate. The amount of strontium in these solutions is the same as that indicated above. Such solutions also contain additional impurities, such as, in particular, sodium, calcium, iron and possibly chlorine and sulfur, in proportions which obviously vary depending on the origin of the raw material used, the process employed, or preliminary operations for prepurification in respect of such elements.

It is these solutions, in particular of barium chloride or nitrate, that are advantageously contacted/extracted according to the present invention. However, any other solution of soluble barium salts may be equally as suitable. In this respect, the use of hydrated barium hydroxide solutions has been found to be particularly advantageous. Indeed, on the one hand, these solutions can easily be prepared by dissolving, in water, the hydroxide in a solid state, which permits avoiding the acidic attack of a barium carbonate. On the other hand, these solutions are such that, when using an extractant having the general formula (III), the optimum pH values existing in the equilibrium medium, as explained hereinafter, are automatically obtained.

The degree of hydration of the hydroxide may be varied, and is advantageously equal to 1, 3 or 8.

In a preferred embodiment of the invention, an octahydrated barium hydroxide is used, having the formula $Ba(OH)_2 \cdot 8H_2O$.

Thus, the initial aqueous barium solution to be purified is first contact with an organic solvent.

The organic solvent comprises at least one of the extractants (i), (ii) and (iii), including admixtures thereof.

Such extractants belong to the family of extraction agents of the cationic or cationic/chelating type.

Among the extractants corresponding to the general formula (I) referred to hereinbefore, namely:

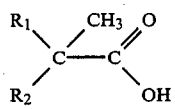

the acids known as "Versatic" acids (registered trademark or Shell Chemical Co.) are particularly suitable, notably "Versatic 911" acid (Shell Chemical Co. registered trademark), which is a mixture of saturated tertiary monocarboxylic acids, in which $R_1$ and $R_2$ are hydrocarbon radicals, withe the total number of carbon atoms in the two radicals being 6, 7 or 8 (produced by oxosynthesis from $C_9$–$C_{11}$ olefins); "Versatic 15/19" (Shell Chemical Co. registered trademark) in which $R_1$ is a hexyl radical and $R_2$ is an octyl radical; and "Versatic 10" acid (Shell Chemical Co. registered trademark), derived from the Shell process for the carboxylation of $C_9$ olefins nd in respect of which $R_1$ and $R_2$ are hydrocarbon radicals, and wherein the total number of carbon atoms in the two radicals is 7.

As indicated above, it is also envisaged to use the compounds having the general formula (II):

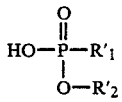

in which $R'_1$ and $R'_2$ are two straight or branched chain alkyl or alkenyl radicals which are not halogenated. In this respect, it has been noted that the use of halogenated such derivatives results in a loss in selectivity as between strontium and barium values in the extraction operation. The total number of carbon atoms present in the radicals $R'_1$ and $R'_2$ must, however, be such that the extraction agent remains substantially insoluble in water.

It is nevertheless preferred to use extractants (II) in which $R'_1$ and $R'_2$ are two alkyl radicals. In another preferred embodiment of the invention, the extractant (II) is advantageously (2-ethylhexyl) (2-ethylhexyl) phosphonic acid.

Finally, concerning the extractants which fall within the class of 8-hydroxyquinolines having the general formula (III):

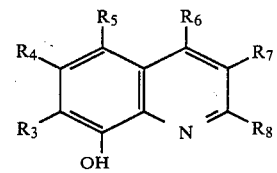

the following are particularly suitable:

(1) α-alkenyl 8-hydroxyquinolines of the following formula:

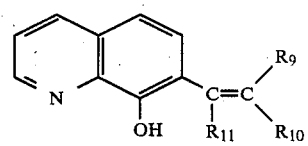

in which $R_9$, $R_{10}$ and $R_{11}$, are each a hydrogen atom or an optionally substituted hydrocarbon radical, advantageously those of the following formulae:

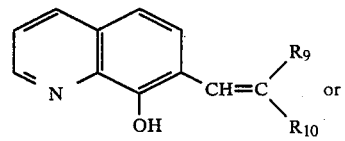

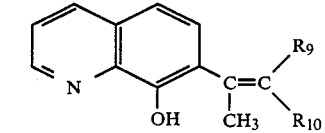

(2) β-alkenyl 8-hydroxyquinolines of the following formula:

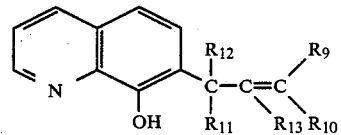

in which $R_9$, $R_{10}$, $R_{11}$, $R_{12}$ and $R_{13}$ are each a hydrogen atom or an optionally substituted hydrocarbon radical;

(3) alkyl 8-hydroxyquinolines of the following formula:

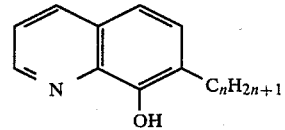

It has been determined that such compounds bearing hydrogen or alkyl substituents have even better properties when the radical $R_3$ at position 7 is an alkyl radical in which the number of carbon atoms ranges from 5 to 25, and preferably from 8 to 15.

In a preferred embodiment, 7-undecyl 8-hydroxyquinoline is used, and even more preferably 7-(1-methyl-4-ethyloctyl) 8-hydroxyquinoline is used.

It is advantageous in certain cases to use an organic phase which comprises at least one extractant of the aforesaid types in solution in a diluent.

Indeed, particularly because of their physical properties, some extraction agents cannot be used in the pure state for the extraction of the initial aqueous phase. In such a case, besides it solubilizing action, the diluent has a favorable influence on the physical properties of the extraction agent or agents, by reducing, for example, the viscosity or density of the organic phase.

By way of example, it is possible to use as the diluent, either snugly or in the form of admixture thereof, compounds such as aromatic hydrocarbons or aliphatic hydrocarbons, which either may or may not be saturated. Kerosense is particularly suitable.

The diluent/extractant proportions are not critical. The concentration of the extraction agent or agents in the diluent may range from about 2 to 60% by weight, relative to the entirety of the solvent. Such level of concentration depends, in particular, on the physical properties which are to be obtained in regard to the initial organic phase.

In the particular case of use of a substituted 8-hydroxyquinoline, it may be appropriate to add a modifier to the organic solvent in order to avoid separation problems which could arise when working with an acid medium.

Thus, it may be possible to use alcohols having a sufficiently long chain as to be water-insoluble, for example, decanol. The proportions of modifier may range from 2 to 80% by weight with respect to the entirety of the solvent, preferably from 5 to 15%.

The contacting between the initial barium-charged aqueous phase and the organic solvent, as well as the extraction operation itself, are carried out in known manner in an apparatus of mixer-settler or column type, for example.

The extraction operation is advantageously carried out in a continuous mode. It may be effected cocurrently, or preferably countercurrently. It will be appreciated that it is possible to use one or more stages.

In this connection, it is important to note that the choice of a sufficient number of stages enables realization of levels of purification in respect of strontium which are as high as may be desired, that is to say, with proportions of that element which are as low as being on the order of a few ppm with respect to the barium. Particularly when using the extractants having the general formula (III), an extraction operation entailing three stages is sufficient to provide impurity levels below 200 ppm, hereinbefore set as the maximum value thereof.

The temperature at which the contacting operation is carried out is not critical. In practice, such temperature will range from ambient temperature to 70° C.

The ratios by volume of the phases are determined in entirely conventional manner in accordance with parameters well known to this art, within the conventional framework of liquid/liquid extraction operations.

For good performance of the process according to the invention, it may be advantageous to introduce a base into the extraction medium in such manner as to produce the following pH values in the equilibrium medium:

(a) in the case of the extractants having the general formula (I), the pH ranges from 5 to 9 and preferably from 7 to 8, in particular for "Versatic 10" acid;

(b) in the case of the extractants having the general formula (II), the operation will be carried out at pH of from 2 to 6, more preferably from 4 to 5; and, finally, (c) for extractants having the general formula (III), the extraction is advantageously carried out at a pH of higher than 10, more preferably from 11 to 13 when using, in particular, 7-undecyl-8-hydroxyquinoline and even more precisely when using 7-(1-mehtyl-4-ethyloctyl)-8-hydroxyquinoline. Such pH conditions relative to such extractants promote barium/strontium separation.

In order to adjust the values of pH to such levels, any suitable base will be used when contacting the aqueous and organic solutions together. However, when employing high values of pH, in particular higher than 12, it is possible, for example, to use sodium hydroxide.

In another preferred embodiment of the invention, the desired conditions in respect of basicity will be achieved by the addition of baryta, of the formula $Ba(OH)_2.8H_2O$, in order to avoid adding back impurities, in particular sodium. In yet another preferred embodiment of the invention, for the same purpose, ammonia is used.

After the contacting operation and then separation of the two phases, the result obtained is, on the one hand, a final aqueous solution which is substantially purified, in particular in respect of strontium values, constituting the desired production, and, on the other hand, an organic phase which is charged with the impurities sought to be removed.

The aforesaid organic phase may then be subjected to an acid washing operation, in particular using nitric acid, in order to recover the small amount of barium present that was extracted in the initial stage, followed by regeneration by bringing it into contact with an aqueous acid solution, in particular an aqueous solution of nitric or hydrochloric acid, and employing steps similar to those described in regard to the first extraction step, thereby producing, after separation of the phases, an aqueous phase which is charged, in particular, with strontium values and a final purified organic phase.

In accordance with another preferred embodiment, the final organic phase may be reused and recycled to the operation for extraction of the impurities contained in the beginning aqueous solution. The system thus operated in a closed-loop configuration.

The final aqueous solution which constitutes the desired production may optionally be subjected to an additional purification treatment which is essentially directed to the removal of sodium. In the case of a barium nitrate solution, that treatment consists of crystallization of the barium salt by evaporation of the solution, or by adding to the barium nitrate solution a solution of ammonium bicarbonate, thereby producing a precipitate of barium carbonate in a high state of purity. Said carbonation treatment can of course also be carried out on barium chloride or hydroxide solutions in order to produce precipitates of barium carbonate in a high state of purity.

Such nitrate or carbonate can then be used for many purposes, in particular for the production of barium titanate having a high degree of purity.

In order to further illustrate the present invention and the advantages thereof, the following specific examples are given, it being understood that same are intended only as illustrative and in nowise limitative.

EXAMPLE 1

Barium carbonate, introduced at a flow rate of 68.7 kg/hr. was acidulated with a 0.61N aqueous nitric acid solution, at a flow rate of 1141 l/hr.

Produced was a solution of barium nitrate, $Ba(NO_3)_2$, in a proportion of 80 g/l, respesenting levels of impurities as set forth in the following table and expressed in % by water or in ppm with respect to the barium:

| Sr | Na | Ca | Fe | Cl |
|---|---|---|---|---|
| 2.44% | 0.33% | 532 ppm | 70 ppm | 172 ppm |

This solution was introduced, at flow rate of 1137 l/hr. into a battery of mixer-settlers, and the extraction operation was carried out continuously and countercurrently in four extraction stages using an organic solvent comprising 7-undecyl-8-hydroxyquinoline which is marketed under the trademark KELEX 100 (registered trademark of Sherex Chemical), at a level of concentration of 0.9 mole/liter, and a modifier, which was decanol, in a proportion of 10% by weight with respect to the solvent, the entirety being diluted in kerosene and introduced at a flow rate of 2850 l/hr.

At the same time, a solution of baryta, in a proportion of 80 g/l, was introduced at a flow rate of 1125 l/hr, at the stage of supplying the nitrate solution, in order to adjust the pH.

The solution of baryta had the following impurities, expressed by weight with respect to the barium:

| Sr | Na | Ca | Fe | Cl |
|---|---|---|---|---|
| 2.43% | 0.20% | 110 ppm | 55 ppm | 2850 ppm |

After separation of the phases, an aqueous solution of barium nitrate was produced, in a proportion of 56 g/l, at a flow rate of 2936 l/hr. Said solution was essentially completely purified and had the following amounts of impurities, expressed by weight with respect to the barium:

| Sr | Na | Ca | Fe | Cl |
|---|---|---|---|---|
| <50 ppm | 0.27% | <10 ppm | <10 ppm | 1500 ppm |

The impurity-charged organic phase was washed in a supplementary stage of the battery with 0.6N nitric acid at a flow rate of 670 l/hr and then regenerated in another supplementary stage by back-extraction of the impurities with 0.6N nitric acid introduced at a flow rate of 105 l/hr, thereby producing a purified organic solvent which could be used for the step of extraction of the impurities, in particular strontium, from the initial aqueous phase, and an aqueous phase which was charged with impurities and which was concentrated to a level of 70% in respect of the strontium.

EXAMPLE 2

A feed solution of $BaCl_2$, in a proportion of 290 g/l, having an amount of strontium of 2% by weight with respect to the barium, was introduced continuously and countercurrently into a three-stage extraction battery, at a flow rate of 55.5 l/hr. The organic solvent was 7-undecyl-8-hydroxyquinoline (KELEX 100), in a proportion of 0.9 mole/liter and a concentration of 30% by weight, and a decanol modifier, 10% by weight, with the entirety being mixed with kerosene.

The organic solvent was introduced at a flow rate of 67.7 l/hr.

At the same time, a 10N sodium hydroxide solution was introduced, at a flow rate of 5.4 l/hr, in the barium chloride feed stage.

After separation of the phases, an aqueous solution of barium chloride was produced, containing 205 g/l, with a proportion of strontium of less than 180 ppm with respect to the barium (Sr/Ba).

The impurity-charged organic phase was regenerated by continuously and countercurrently contacting same with 3.4N hdyrochloric acid, introduced at a flow rate of 12 l/hr.

EXAMPLE 3

A feed solution of $BaCl_2$, containing 300 g/l and having a proportion of strontium of 2% by weight with respect to the barium, was introduced continuously and countercurrently at stage No. 10 of a twelve-stage extraction battery, at a flow rate of 54 l/hr. The organic solvent was (2-ethylhexyl) (2-ethylhexyl) phosphonic acid, at 1 M/l in kerosene. The organic solvent was introduced at stage No. 1, at a flow rate of 620 l/hr.

At the same stage, a 10N ammonia solution was introduced, to maintain the pH of the aqueous phase at 4.

Finally, a wash solution of hydrochloric acid, at a level of concentration of 2.9N and a flow rate of 54 l/hr, was introduced at stage No. 12.

An aqueous solution of barium was recovered at stage No. 1, which contained only 195 ppm of strontium with respect to the barium (Sr/Ba).

The impurity-charged organic phase was regenerated countercurrently in a two-stage extraction battery using 2.9N hydrochloric acid, at a flow rate of 11.8 l/hr. The organic phase could be recycled to stage No. 1 of the extraction battery.

EXAMPLE 4

A feed solution of $BaCl_2$ containing 300 g/l and having a proportion of strontium of 2% by weight with respect to the barium, was introduced continuously and countercurrently into a fifteen-stage extraction battery at stage No. 13, at a flow rate of 54 l/hr. The organic solvent was "Versatic 10" acid (Shell Chemical Co. registered trademark), at 1 M/l, in kerosene. The organic solvent was introduced at stage No. 1 at a flow rate of 620 l/hr. At the same stage, a 10N ammonia solution was introduced in such manner as to maintain the pH of the aqueous phase at 7.

Finally, a 2.9N HCl wash solution was introduced at a flow rate of 67.5 l/hr, at stage No. 15.

An aqueous solution of barrium was recovered at stage No. 1, which contained only 190 ppm of strontium with respect to the barium (Sr/Ba).

The impurity-charged organic phase was regenerated countercurrently in a two-stage extraction battery using 2.9 N hydrochloric acid at a flow rate of 23 l/hr. The organic phase could be recycled to stage No. 1 of the extraction battery.

EXAMPLE 5

Octahydrated barium hydroxide, introduced at a flow rate of 17.2 kg/hr, was dissolved in water (20° C.) at a flow rate of 2,860 l/hr.

A solution of barium hydroxide was produced, in a proportion of 60 g/l, representing levels of impurities as set forth in the following table and expressed in % by weight or in ppm with respect to the barium:

| Sr | Na | Ca | Fe | Cl |
|---|---|---|---|---|
| 1.92% | 0.27% | 0.18% | 140 ppm | 0.39% |

This solution was introduced, at a flow rate of 2,860 l/hr, into a battery of mixer-settlers, the extraction operation being carried out continuously and countercurrently in fourteen extraction stages using an organic solvent comprising 7-undecyl-8-hydroxyquinoline, marketed under the trademark KELEX 100 (registered trademark of Sherex Chemical), at a level of concentration of 0.22 mole/liter, the entirety being diluted with kerosene and introduced at a flow rate of 3,177 l/hr.

After separation of the phases, an aqueous solution of barium hydroxide was produced, in a proportion of 48.6 g/l. This solution was substantially completely purified and had the following amounts of impurities, expressed by weight with respect to the barium:

| Sr | Na | Ca | Fe | Cl |
|---|---|---|---|---|
| <50 ppm | 0.34% | <10 ppm | <10 ppm | 0.5% |

The impurity-charged organic phase was regenerated in a supplementary stage of the battery for back-extraction of the impurities using 1.45N hydrochloric acid introduced at a flow rate of 144 l/hr, thereby producing a purified organic solvent which could be used in the step for extraction of the impurities, in particular strontium, from the initial aqueous phase, and an aqueous phase which was charged with impurities and which could be easily reused in the conventional plant for the production of barium carbonate.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of a purified barium salt essentially devoid of strontium impurities, comprising extracting an aqueous solution of impure barium values with an organic solvent medium which comprises at least one of the following substantially water-insoluble organic extractants:

(i) a carboxylic acid having the following general formula (I):

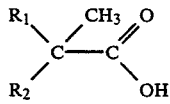

in which $R_1$ and $R_2$ are straight or branched chain alkyl radicals, or substituted such alkyl radicals, with the proviso that the total number of carbon atoms present in said two radicals is at least equal to 6;

(ii) a phosphonic acid monoester having the following general formula (II):

in which $R'_1$ and $R'_2$ are straight or branched chain, nonhalogenated alkyl or alkenyl radicals;

(iii) an 8-hydroxyquinoline having the following general formula (III):

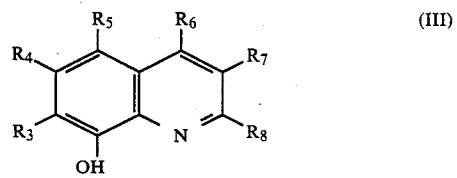

in which $R_3$, $R_4$, $R_5$, $R'hd 6$, $R_7$ and $R_8$, which may be identical or different, are each hydrogen, or a substituted or unsubstituted alkyl, alkenyl, alicyclic or aromatic radical, with the proviso that $R_3$, $R_4$, $R_5$, $R_6$, $R_7$ and $R_8$ may not all be hydrogen at the same time; separating the mixture of extraction into a purified aqueous phase comprising the desired barium salt values and an organic phase comprising those impurity values sought to be removed; and thence recovering said purified aqueous phase.

2. The process as defined by claim 1, further comprising recovering purified barium salt values from said purified aqueous phase.

3. The process as defined by claim 1, said organic solvent medium comprising at least one extractant having the formula (I).

4. The process as defined by claim 1, said organic solvent medium comprising at least one extractant having the formula (II).

5. The process as defined by claim 4, wherein said extractant having the formula (II), $R'_1$ and $R'_2$ are alkyl radicals.

6. The process as defined by claim 5, said extractant comprising (2-ethylhexyl) (2-ethylhexyl) phosphonic acid.

7. The process as defined by claim 1, said organic solvent medium comprising at least one extractant having the formula (III).

8. The process as defined by claim 7, wherein said extractant having the formula (III), $R_3$, $R_4$, $R_5$, $R_6$, $R_7$ and $R_8$ are either hydrogen or an alkyl radical with the proviso that $R_3$, $R_4$, $R_5$, $R_6$, $R_7$ and $R_8$ may not all by hydrogen at the same time.

9. The process as defined by claim 8, wherein said extractant having the formula (III), $R_3$ is an alkyl radical.

10. The process as defined by claim 9, wherein $R_3$ is undecyl.

11. The process as defined by claim 9, wherein $R_3$ is 1-methyl-4-ethyloctyl.

12. The process as defined by claim 1, said organic solvent medium comprising at least one diluent.

13. The process as defined by claim 12, said at least one diluent comprising a saturated or unsaturated aliphatic hydrocarbon, an aromatic hydrocarbon, or mixture thereof.

14. The process as defined by claim 13, said at least one diluent comprising kerosene.

15. The process as defined by claim 1, said organic solvent medium comprising at least one modifier therefor to reduce separation of components of the solvent under acidic condition.

16. The process as defined by claim 15, said at least one modifier comprising a substantially water-insoluble alcohol.

17. The process as defined by claim 3, the equilibrium mixture of extraction having a pH of from 5 to 9.

18. The process as defined by claim 3, the equilibrium mixture of extraction having a pH of from 7 to 8.

19. The process as defined by claim 4, the equilibrium mixture of extraction having a pH of form 2 to 6.

20. The process as defined by claim 4, the equilibrium mixture of extraction having a pH of from 4 to 5.

21. The process as defined by claim 7, the equilibrium mixture of extraction having a pH of greater than 10.

22. The process as defined by claim 7, the equilibrium mixture of extraction having a pH of from 11 to 13.

23. The process as defined by claim 1, carried out continuously and countercurrently.

24. The process as defined by claim 1, further comprising back extracting said separated organic phase with an aqueous acid solution and separating the mixture of back-extraction into a purified organic phase and an impure aqueous phase.

25. The process as defined by claim 24, further comprising recycling said purified organic phase to said starting aqueous solution of impure barium values.

26. The process as defined by claim 1, said starting aqueous solution of impure barium values comprising barium nitrate.

27. The process as defined by claim 26, comprising adding ammonium bicarbonate to said purified aqueous phase, whereby a precipitate of purified barium carbonate is produced.

28. The process as defined by claim 1, said starting aqueous solution of impure barium values comprising barium chloride.

29. The process as defined by claim 1, said starting aqueous solution of impure barium values comprising hydrated barium hydroxide.

30. The process as defined by claim 29, said starting aqueous solution of impure barium values comprising octahydrated barium hydroxide.

* * * * *